United States Patent
Anand (10) Patent No.: US 9,313,223 B2
(45) Date of Patent: Apr. 12, 2016

(54) SYSTEMS AND METHODS FOR TOKENIZING USER-GENERATED CONTENT TO ENABLE THE PREVENTION OF ATTACKS

(71) Applicant: Kunal Anand, San Jose, CA (US)

(72) Inventor: Kunal Anand, San Jose, CA (US)

(73) Assignee: Prevoty, Inc., Los Angeles, CA (US)

( * ) Notice: Subject to any disclaimer, the term of this patent is extended or adjusted under 35 U.S.C. 154(b) by 224 days.

(21) Appl. No.: 13/839,622

(22) Filed: Mar. 15, 2013

(65) Prior Publication Data

US 2014/0283033 A1 Sep. 18, 2014

(51) Int. Cl.
*H04L 29/06* (2006.01)
*G06F 21/55* (2013.01)

(52) U.S. Cl.
CPC .......... *H04L 63/1441* (2013.01); *G06F 21/554* (2013.01); *G06F 2221/031* (2013.01); *G06F 2221/2119* (2013.01)

(58) Field of Classification Search
None
See application file for complete search history.

(56) References Cited

U.S. PATENT DOCUMENTS

| 5,958,013 | A * | 9/1999 | King | H04L 29/06 709/227 |
| 7,653,735 | B2 * | 1/2010 | Mandato | H04L 12/5695 709/205 |
| 7,975,306 | B2 * | 7/2011 | Chess | G06F 21/54 713/188 |
| 8,271,403 | B2 * | 9/2012 | Rieck | G06F 7/02 706/12 |
| 8,468,244 | B2 | 6/2013 | Redlich et al. | |
| 8,572,403 | B2 * | 10/2013 | Beaumont | G06F 21/84 713/189 |
| 2003/0177187 | A1 * | 9/2003 | Levine | A63F 13/10 709/205 |
| 2004/0003373 | A1 * | 1/2004 | Van De Vanter et al. | 717/112 |
| 2005/0114771 | A1 * | 5/2005 | Piehler | G06F 17/21 715/264 |
| 2005/0138109 | A1 * | 6/2005 | Redlich | G06F 17/30699 709/201 |

(Continued)

OTHER PUBLICATIONS

Guo, Yongming; Chen, Dehua; Liu, Liangxu; Le, Jiajin. A Frame of Personalized Information Filtering System based on XML. Fourth International Conference on Networked Computing and Advanced Information Management, 2008. NCM '08. vol. 1. http://ieeexplore.ieee.org/stamp/stamp.jsp?tp=&arnumber=4623972.*

(Continued)

*Primary Examiner* — Dede Zecher
*Assistant Examiner* — Jeremiah Avery
(74) *Attorney, Agent, or Firm* — Kang S. Lim (57) ABSTRACT

The present invention relates to systems and methods for the tokenization of user-generated content in order to prevent attacks on the user-generated content. The systems and methods initially pre-process the user-generated content string utilizing a secondary input of target language. Pre-processing may also include initialization of finite state machines, token markers and string buffers (text, HTML tag name, HTML attribute name, HTML attribute value, CSS selector, CSS property name, and CSS property value). The user-generated content string is scanned by rune, and the system sends each rune to a specific buffer based upon signaling by individual finite state machine states. Buffers are then converted to token stream nodes to be inserted into the token stream. The tokens represent a string of characters and are symbolically categorized according to activated finite state machine states.

18 Claims, 8 Drawing Sheets

(56) References Cited

U.S. PATENT DOCUMENTS

| | | | | |
|---|---|---|---|---|
| 2005/0273772 | A1* | 12/2005 | Matsakis | G06F 8/41 |
| | | | | 717/136 |
| 2007/0067461 | A1 | 3/2007 | Savchenko et al. | |
| 2009/0106550 | A1* | 4/2009 | Mohamed | H04L 63/045 |
| | | | | 713/156 |
| 2009/0210631 | A1* | 8/2009 | Bosworth | H04L 67/10 |
| | | | | 711/141 |
| 2009/0282480 | A1 | 11/2009 | Lee et al. | |
| 2009/0292983 | A1 | 11/2009 | Anand et al. | |
| 2010/0257603 | A1 | 10/2010 | Chander et al. | |
| 2010/0333167 | A1 | 12/2010 | Luo et al. | |
| 2011/0239294 | A1 | 9/2011 | Kim et al. | |
| 2011/0258704 | A1* | 10/2011 | Ichnowski | H04L 67/02 |
| | | | | 726/26 |
| 2012/0117644 | A1 | 5/2012 | Soeder | |
| 2013/0204981 | A1 | 8/2013 | Brundage et al. | |
| 2013/0254829 | A1 | 9/2013 | Jakubowski et al. | |

OTHER PUBLICATIONS

Tang, Jie; Liu, Shaoshan; Liu, Chen; Gu, Zhimin; Gaudiot, Jean-Luc. Acceleration of XML Parsing through Prefetching. IEEE Transactions on Computers. vol. 62, Issue: 8. Pub. Date: 2012. http://ieeexplore.ieee.org/stamp/stamp.jsp?tp=&arnumber=6189313.*

Harrusi, S.; Averbuch, A.; Yehudai, A. XML Syntax Conscious Compression. Proceedings Data Compression Conference, 2006. DCC 2006. http://ieeexplore.ieee.org/stamp/stamp.jsp?tp=&arnumber=6189313.*

ISA, "International Search Report and Written Opinion" corresponding PCT Application No. PCT/US2014/030076, mailed Oct. 31, 2014, 10 pages.

USPTO, "Non-Final Office Action," corresponding U.S. Appl. No. 13/839,807, mailed Sep. 25, 2014, 10 pages.

* cited by examiner

SYSTEMS AND METHODS FOR TOKENIZING USER-GENERATED CONTENT TO ENABLE THE PREVENTION OF ATTACKS

CROSS REFERENCE TO RELATED APPLICATIONS

This application is related to co-pending and concurrently filed application U.S. Ser. No. 13/839,807, filed Mar 15, 2013, entitled "Systems and Methods for Parsing User-Generated Content to Prevent Attacks" by Kunal Anand, which is incorporated by reference herein for all purposes.

BACKGROUND

The present invention relates to systems and methods for preventing malicious attacks contained within user-generated content in an online computing setting. Traditionally, sophisticated third parties like publishers produced content for users via the Internet. Increasingly, however, users are interested in more interactive experiences. These users don't merely want to consume content, they wish for more immersive, participatory experiences. Today, users are significant creators of user-generated content.

Figure 1:
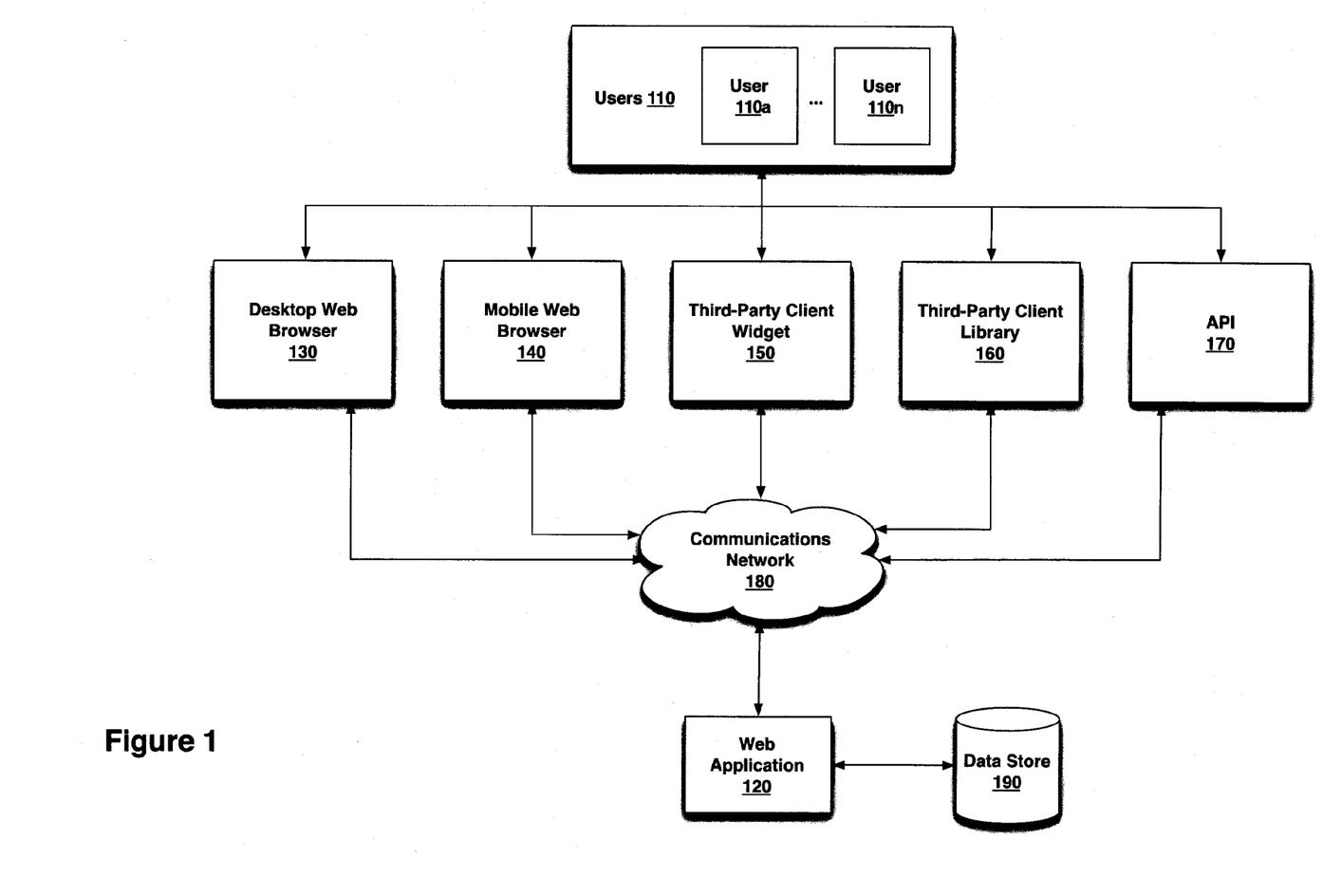
FIG. 1 is a schematic block diagram for the structure of a network which enables users to generate content, in association with some embodiments.

As such, user-generated content has become a rapidly expanding field. Users 110 typically create content through interacting with web applications 120 from desktop web browsers 130, mobile web browsers 140, third-party client widgets 150, third-party client libraries 160, and application programming interfaces (APIs) 170. These are the most popular mechanisms of contributing user-generated content over Hypertext Transfer Protocol (HTTP). Often, user-generated content may contain text (plain or localized in an international language), hypertext markup language (HTML), cascading style sheet (CSS) information, and JavaScript (JS), among other known script variants. User-generated content is delivered as strings and/or sequences of bytes to web applications 120 via a communications network 180, such as HTTP, or read from data persistence stores 190, such as databases, caches, or queues.

With the proliferation of user content, there has been an equally robust increase in the number of attacks embedded in user-generated content. These attacks enable malicious parties to gain personal (and potentially sensitive) information on users, redirect users to malicious websites, track user browsing behavior, and otherwise take advantage of users, often without them being aware of the attack.

User-generated content can contain two significant attack variants: cross-site scripting (XSS) or structured query language (SQL) injection. An XSS attack exploits security vulnerabilities found in web applications. XSS enables an attacker to inject a client-side script into web pages viewed by other users, allowing said attacker to bypass access controls. XSS is possible through malicious JS tags/attributes/protocols, CSS properties, and rich media tags. XSS attacks accounted for roughly 84% of all security vulnerabilities documented by a major security firm in 2007. XSS attacks have the ability to read and write web browser cookies (containing private user data), create web application requests on behalf of a user without acknowledgement, redirect users to malicious websites, as well as other behaviors that take advantage of a user's trust.

In contrast, SQL injection is designed to attack data-driven applications. This is accomplished by providing fragments of a SQL query into an input variable, supplied by a web application user. When the input is evaluated by the application, the tainted SQL query is executed, allowing attackers to CRUD (create, read, update, delete) information (potentially sensitive) from a database.

Currently, a number of techniques exist to reduce the danger of user-generated content attacks. The most commonly employed techniques utilize filters that attempt to prevent XSS and SQL injection attacks by using a "blacklist" to remove content. As used herein, the term "blacklist" means a source of information that enumerates a list of pre-defined attacks to be removed. The process of using the blacklist to perform transformations employs a strategy of applying heuristics via string and regex (regular expression) replacements. At runtime, this flow typically looks like:
  a) Load a blacklist from disk/memory;
  b) Verify the integrity of the blacklist;
  c) Iterate through the blacklist while generating key/value objects as a representation of the blacklist (typically performed to avoid heavy disk reads and unnecessary computation cycles).

After the blacklist has been loaded, it can be used to remove malicious content and potential content attacks. The blacklist process is comprised of the following steps:
  a) Iterate through each of the key/value objects that represent the blacklist;
  b) Perform a string/regular expression replacement with each of the objects, thereby transforming the original content;
  c) Return the transformed content.

Unfortunately, current methods utilizing blacklists for the filtering of content attacks in user-generated content is insufficient to prevent many of said attacks from being successful or otherwise obstruct the content. This is because blacklist-based security filtering suffers from three major drawbacks. The first drawback is that these filters are employed in an iterative model way to remove first-level attacks and completely miss nested attacks. One example is a concatenation-based attack that comes together post-blacklist filtering.

Secondly, these existing blacklist-based filters run the risk of removing fragments of content that may resemble HTML, CSS, and SQL injection but are not. The intent and fidelity of the source content therefore has the potential of being ruined.

Lastly, and possibly most importantly, these filters are immediately outdated as new attack variants are discovered. The entire system is built on top of existing attack definitions and is unreactive to new attacks. Consequently, a system like this has virtually no defense against undefined and newly discovered attacks, such as "zero-day" exploits.

It is therefore apparent that an urgent need exists for improved systems and methods for preventing attacks against user-generated content. Such systems and methods enable attack prevention that are not reactive to the introduction of new attacks, and may prove to be more accurately able to prevent attacks than current systems.

SUMMARY

To achieve the foregoing and in accordance with the present invention, systems and methods for tokenization of user-generated content are instrumental to enable downstream parsing of the user-generated content. The tokenization process results in a token stream that may be readily compared to allowed, also known as "whitelisted", data in order to prevent attacks on the user-generated content.

In some embodiments, the security system capable of tokenization initially pre-processes the user-generated content input string utilizing a secondary input of target language. Pre-processing may also include initialization of finite state machine states, token markers and string buffers. Next, meaningful tokens may be extracted from the pre-processed user-generated content string to derive a representable token stream. The tokens represent a string of characters and are categorized according to symbolic rules.

Symbolic extraction from the user-generated content may utilize the activation of finite state machine states. Each activated state signals guide the insertion of tokens into specific string buffers. These buffers include text, HTML tag names, HTML attribute names, HTML attribute values, CSS selectors, CSS property names, and CSS property values. User-generated content is lexically scanned by individual runes.

Next, the buffers are converted into strings, based on the secondary input of target language. The strings are appended to the token stream as token stream nodes. The process of converting buffers into token stream nodes involves the instantiation of token stream nodes and assigning specific data based on type (text, tag, etc.). Buffers that did not activate finite state machine states are also inserted into the token stream as text nodes. The complete token stream may be returned, and the system may clear finite state machine states, token markers, and string buffers at the end of the tokenization process.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

As previously noted, user-generated content has become far more prevenient in recent years. As a direct correlation, corresponding attacks embedded in such content have likewise increased. Turning to FIG. 1, Users 110 typically create content through interacting with web applications 120 from desktop web browsers 130, mobile web browsers 140, third-party client widgets 150, third-party client libraries 160, and application programming interfaces (APIs) 170. These are the most popular mechanisms of contributing user-generated content over Hypertext Transfer Protocol (HTTP). Often, user-generated content may contain text (plain or localized in an international language), hypertext markup language (HTML), cascading style sheet (CSS) information, and JavaScript (JS), among other known script variants. User-generated content is delivered as strings and/or sequences of bytes to web applications 120 via a communications network 180, such as HTTP, or read from data persistence stores 190, such as databases, caches, or queues.

The present invention relates to novel systems and methods for preventing attacks on user-generated content. Unlike previous systems that utilize blacklists, as previously discussed, the present system utilizes a tokenization process followed by a parsing process, which compares user-generated content nodes to "whitelists" of allowable data. By screening for allowable data, as opposed to scripts that are attacks, such a system and methods becomes proactive rather than reactive against security threats. This enables a higher degree of protection for users.

Note that while much of the discussion contained herein relates to user-generated content in the context of Internet social media sites and the like, such systems and methods are valuable wherever HTTP content is open to attack via XSS or SQL injection.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. System

Figure 2:
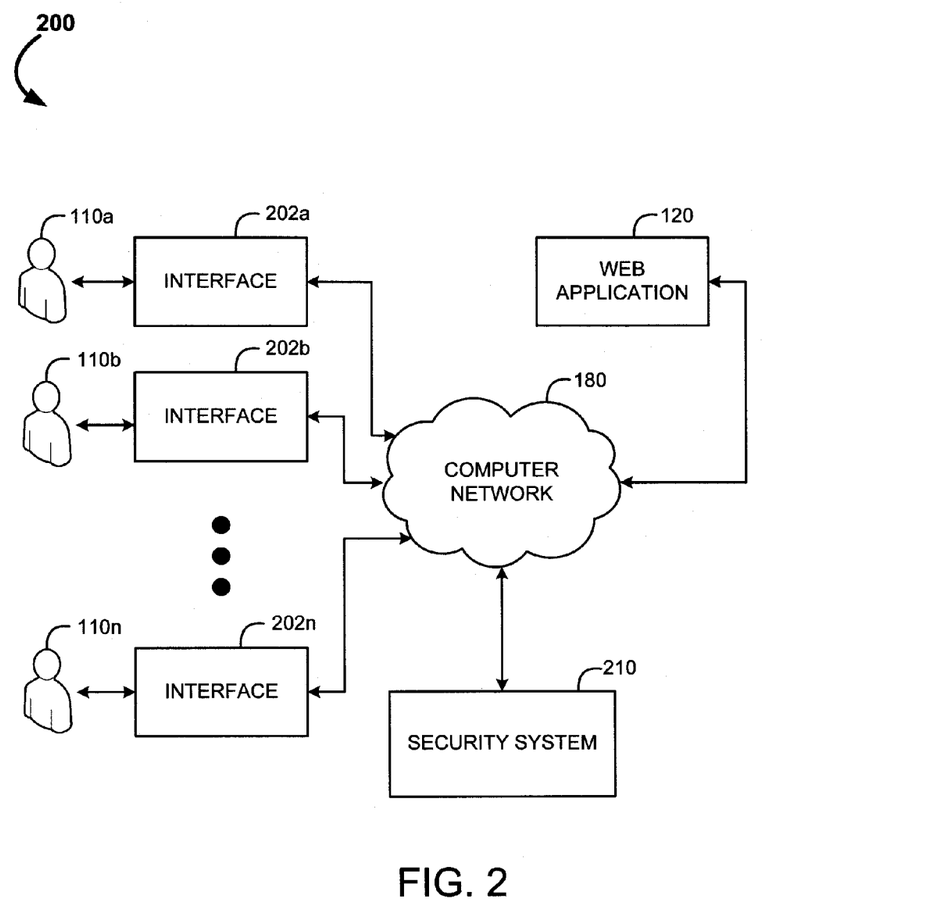
FIG. 2 is a schematic block diagram for a system which prevents attacks on the user-generated content, in association with some embodiments.

To facilitate the discussion, FIG. 2 illustrates a system to protect user-generated content from malicious attacks, in accordance with some embodiments. In this example system, the users 110*a* to 110*n* are seen interacting with interfaces 202*a* to 202*n*. The interfaces may include any of those illustrated in FIG. 1, including web applications 120 from desktop web browsers 130, mobile web browsers 140, third-party client widgets 150, third-party client libraries 160, and application programming interfaces (APIs) 170. Via the interface 202*a*, the user 110*a* may generate content that is supplied via the computer network 180 to the web application 120. The computer network 180 may be the Internet, internal corporate network, or any other wide area network.

A security system 210 may interact with the user content prior to access by the web application 120, or as part of the web application's security features. The security system is illustrated in greater detail in FIG. 3. Here it can be seen that the security system 210 includes a front-end server 302, including a computer processor, which handles the interaction between the computer application and computer network. The server is capable of receiving the user-generated content, and provides it to a pre-processor 304 that utilizes a secondary input of the target's language to ensure that tokenization (described in greater detail below) is capable of iterating over bytes correctly. The target language is simply an identifier that represents the character set of the input. Several examples of this include ASCII, Latin-1, UTF-8, and UTF-16.

Figure 3:
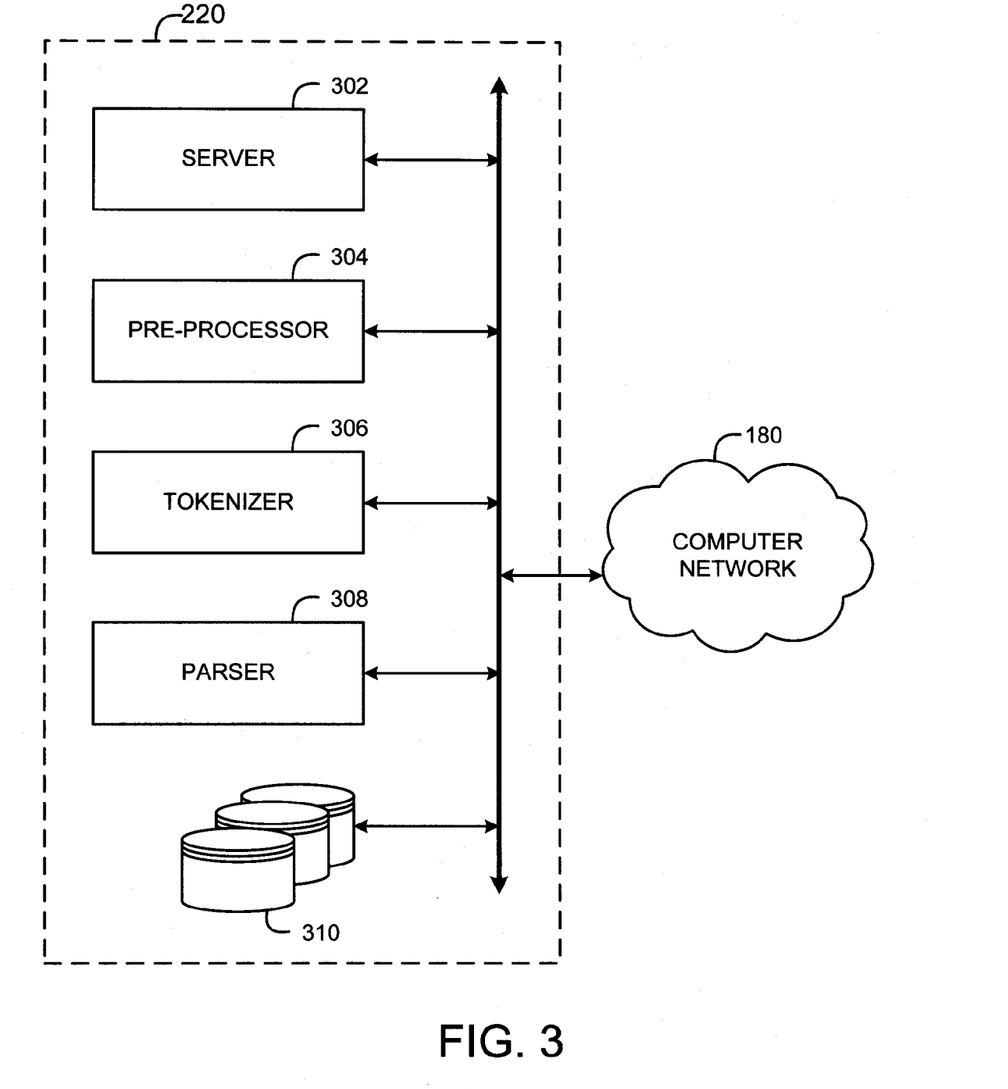
FIG. 3 is a more detailed schematic block diagram for the security system, in accordance with some embodiments.

The security system 210 also includes a tokenizer 306 that is capable of extracting meaningful tokens from the content for further analysis. This tokenized stream that is generated by the tokenizer 306 may be processed by a parser 308, which compares the nodes within the token stream to a whitelist in order to prevent the execution of content attacks. Whitelists are configurations of approved data that, if properly matched, allow for the pass through within the stream. Data not matching the whitelist is presumed to not belong, and thus is discarded by the security system.

In comparison to using a blacklist, the implementation of a whitelist is a far superior approach for sanitizing content. As more attacks are discovered, the blacklist will linearly grow. With a whitelist implementation, more attack preventions may not require additional configuration. Whitelists may be stored within the security system in a database 310, cache, or memory for ready retrieval.

II. Tokenization

The usage of a whitelist requires that the content be chunked into a token stream comprised of recognizable token stream nodes for future parsing. This process may be referred to as "tokenizing" or lexical analysis in the context of this application. In order to describe the process of tokenization with more clarity, attention is directed to FIG. 4, where a high level flow chart 400 is provided for the process of tokenization.

Figure 4:
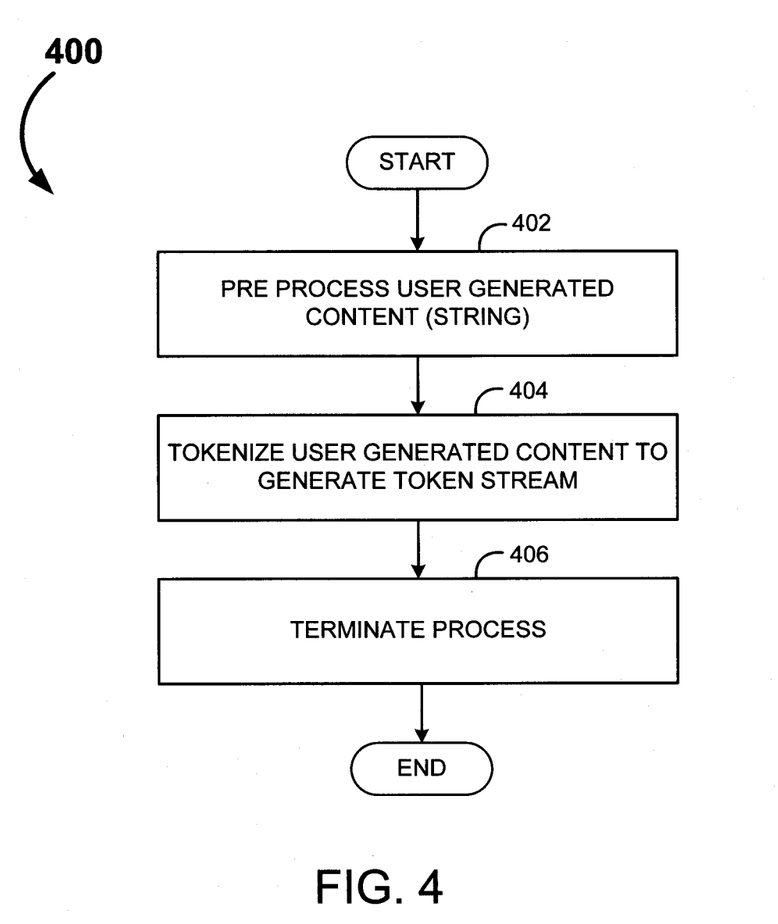
FIGS. 4-7 are example flow charts for the process of tokenizing user-generated content, in accordance with some embodiments.

In this example process flow, user content is input to the tokenizer 306 as a string or a sequence of bytes. The result is a token stream of token nodes with support for further operations: the addition/removal of HTML tags, HTML attributes, CSS selectors, CSS properties, and HTML tag balancing. These operations can only be performed after a valid token stream is yielded from the tokenization process.

The tokenizer 306 can be implemented in a development, testing, and production environment to accept content through communication protocols, including standard input (STDIN), transmission control protocol (TCP) requests, HTTP requests, and through a remote procedure call (RPC) protocol. Of course, it is considered within the scope of this disclosure that any communication protocol that supports the ability to send strings and/or bytes can interact with this processor.

Figure 5:
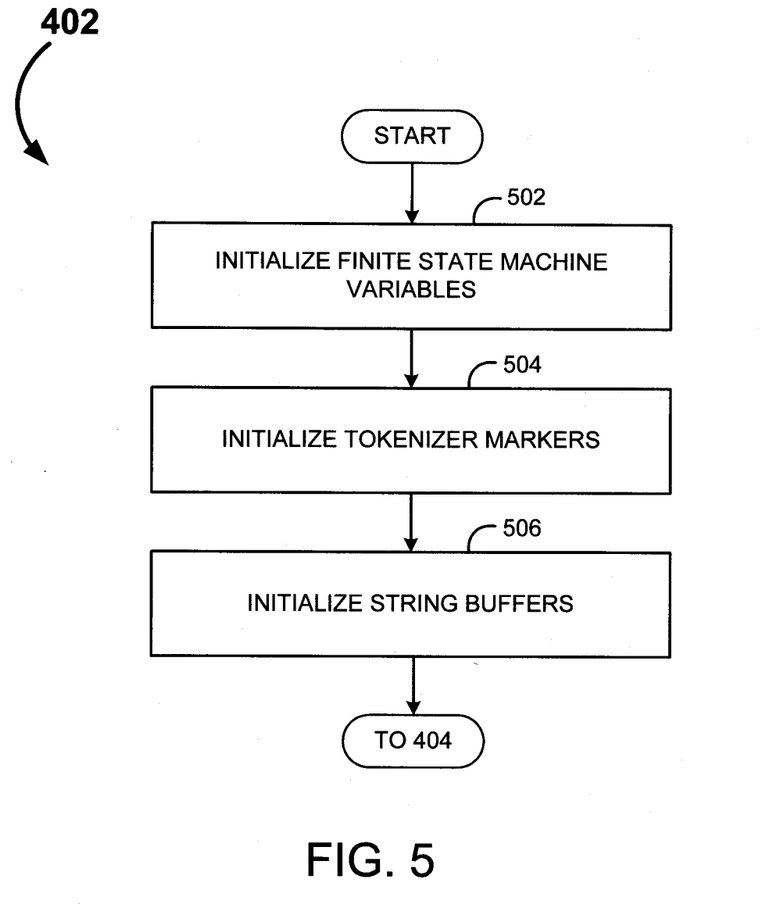

For the tokenization process, initially the content string is pre-processed (at 402). A secondary input of the target's language is provided at this step to ensure that the tokenization phase is able to correctly iterate over bytes while providing first-class support for internationalized characters. Pre-processing is described in greater detail in reference to FIG. 5. The pre-processing step also includes the initialization of finite-state machine (FSM) variables (at 502), tokenizer markers (unsigned integers) (at 504), and string buffers (at 506). FSM variables are used by the programmed FSM to signal states for appending parsed text into buffers as well as constructing/appending token stream nodes into the token stream. The FSM variables are symbolic identifiers that guide the flow of tokenization. Various actions can happen when specific FSM states are activated. One example is at the start of an HTML tag to convert existing text buffers into a token stream text node, and subsequently insert it into the token stream.

Returning to FIG. 4, the next step is tokenization (at 404) of the pre-processed user-generated content. Tokenization is the process of extracting meaningful tokens from content to be further analyzed by a parser or subsequent phases of lexical analysis. A token represents a string of characters, categorized according to the rules as a symbol (e.g., IDENTIFIER, NUMBER, COMMA). Extraction of symbolic data from strings requires scanning input by individual runes. Through activating individual finite state machine states, each rune is pushed into a specific buffer (text, HTML tag name, HTML attribute name, HTML attribute value, CSS selector, CSS property name, CSS property value).

Figure 6:
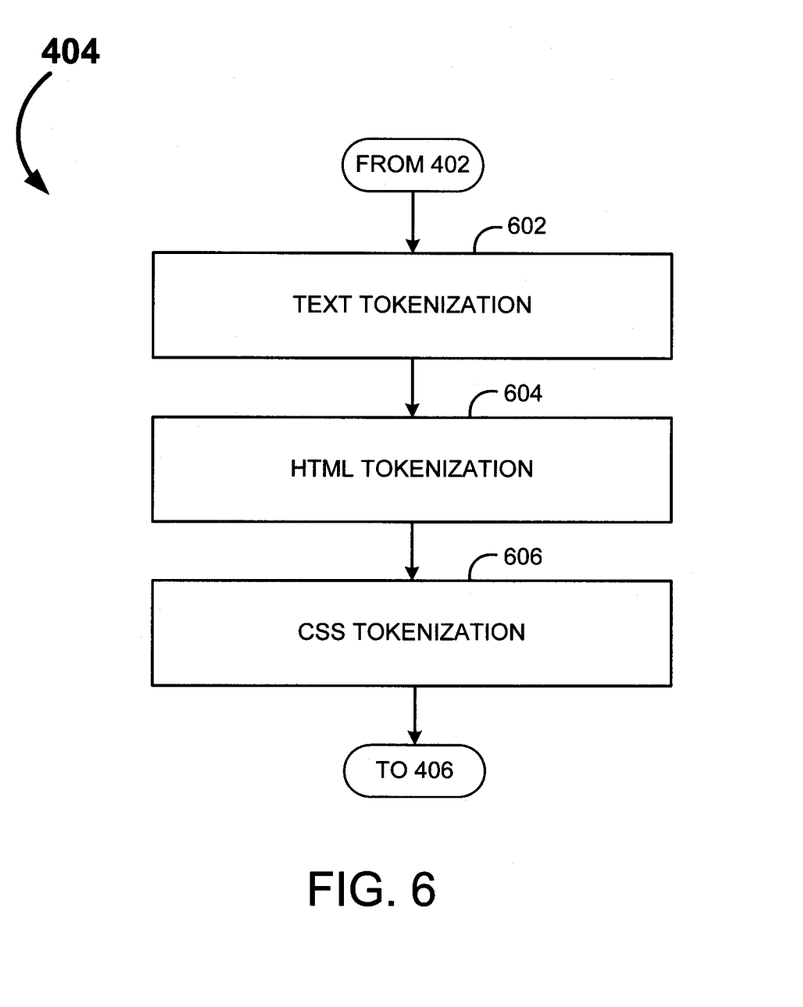

Details of tokenization are provided in FIG. 6. Buffers allow text (at 602), HTML tag names/attributes (at 604) and CSS selectors/properties (at 606) to accumulate, of which the final accumulation representing the intent of user-generated content. HTML tokenization precedes CSS tokenization, as the latter is nested within the former. At the end of each state, particular buffers are used to construct specific token stream nodes to be inserted into the token stream and subsequently cleared to handle future finite state machine states.

In the case of adding HTML tag nodes to the token stream, tokenization markers are established on matching opening/closing tag nodes to support future tag balancing. This is accomplished by iterating through the token stream in reverse searching for the complementary tag node. In the case of an opening tag, a complementary tag node is defined as a closing tag with the same tag name. In the case of a closing tag, a complementary tag node is defined as an opening tag with the same tag name. Unlike parsing a well-formed Extensible Markup Language (XML) document, user-generated HTML may not be properly formatted. The tokenizer 306 is constructed to handle malformed HTML and CSS while adhering to World Wide Web Consortium (W3C) specifications.

Figure 7:
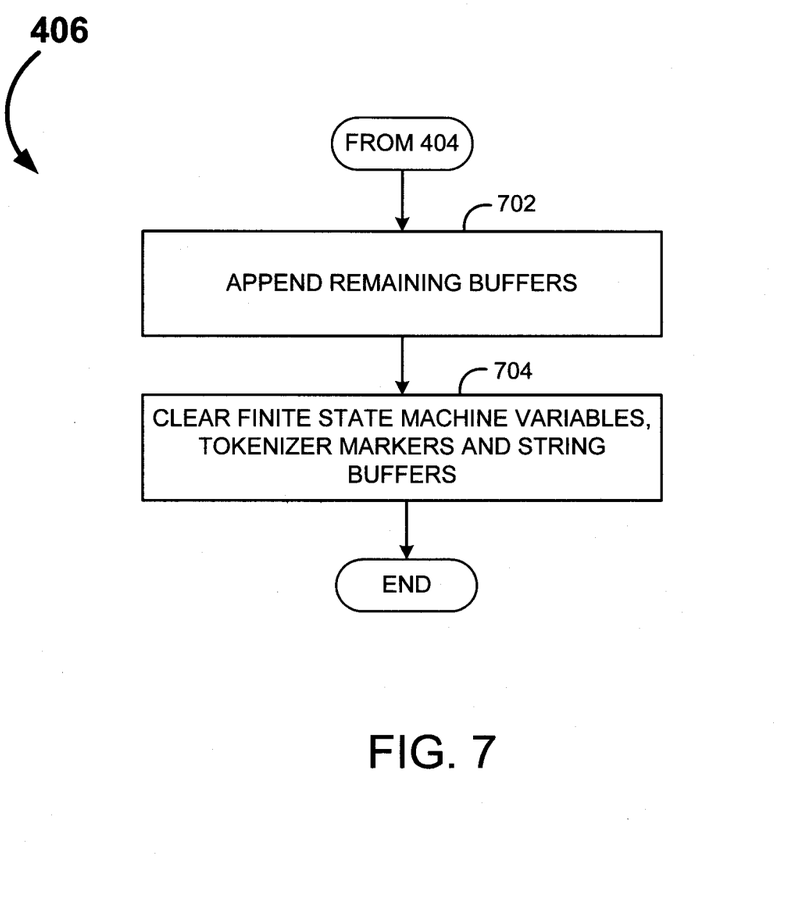

Returning to FIG. 4, the third final phase of tokenization is termination of the process (at 406) by inserting the remaining buffers that did not activate finite state machine states into the token stream. Turning to FIG. 7, these buffers are converted to strings that are HTML encoded and appended to the token stream as text nodes (at 702). Finite state machine variables, token markers, and string buffers are all cleared at the end of this process (at 704). At the end of this process, a token stream full of token stream nodes is yielded to the caller.

Below, is provided a table illustrating significant finite state machine states that are utilized within the disclosed tokenization process:

| States | Action |
| --- | --- |
| Text | Build a string buffer of text |
| HTML Tag Name | Build a string buffer of the tag name |
| Attribute Name | Build a string buffer of the attribute name |
| Attribute Value | Build a string buffer of the attribute value |
| CSS Selector(s) | Build a string buffer of the CSS selector(s) |
| CSS Property Name | Build a string buffer of the CSS property name |
| CSS Property Value | Build a string buffer of the CSS property value |

III. Tokenization Example

Now an example of tokenization will be provided to assist in clarification of the process. Note, however, that this example is but one possible way of tokenizing and is not intended to limit the overall scope of this disclosure.

For example, given the following user input:

```
<div id="a">
    <strong>This is bold text</strong>
</div>
```

The final token stream yielded by the tokenization process is:

```
[
    {
        class : tag,
        name : "div",
        type : opening,
        attributes : { "id" : "a" },
        opening : 0,
        closing: 4
    },
    {
        class : tag,
        name : "strong",
        type : opening,
        opening : 1,
        closing: 3
    },
    {
        class : text,
        text : "This is bold text",
    },
    {
        class : tag,
        name : "strong",
        type : closing,
        opening : 1,
        closing: 3
    },
    {
        class : tag,
        name : "div",
        type : closing,
        opening : 0,
        closing: 4
    },
]
```

The above example is a simple visualization of the nodes that comprise a reference token stream. From the token stream, it's evident that HTML tags have opening/closing values, which allows for future tag balancing and other manipulation. Text nodes are distinguished from tag nodes in that text nodes only contain a single value of the text content.

IV. Parsing

Figure 8:
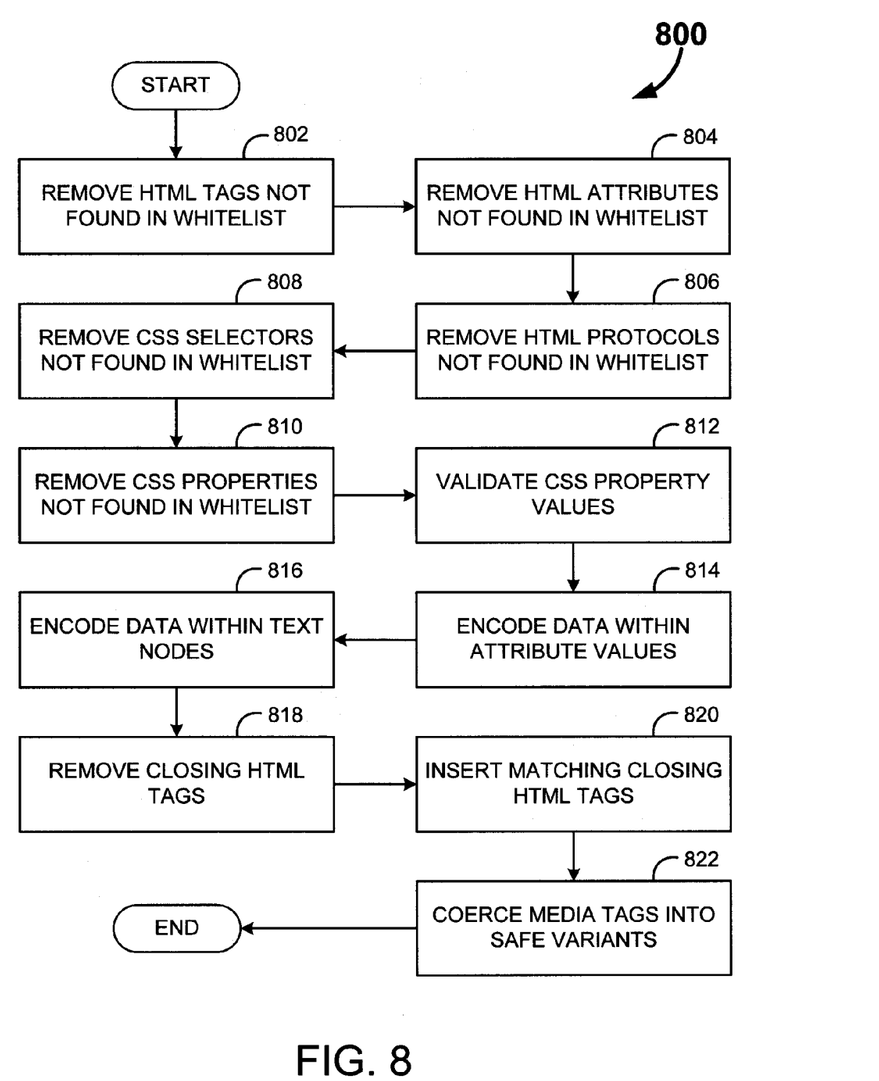
FIG. 8 is an example flow chart for the process of parsing user-generated content, in accordance with some embodiments.

Once the token stream has been constructed in the manner disclosed above, the system may check if each node is whitelisted. FIG. 8 illustrates the parsing process in flowchart form (at 800), in accordance with some embodiments. The parsing process includes the removal of HTML tags that are not in the whitelist (at 802). This involves iterating over the token stream while filtering for nodes that are HTML tags. For each tag, the system checks whether or not it belongs in the whitelist. If the tag belongs, the process proceeds to HTML attribute whitelist checking. If the tag does not belong, then it is removed, as well as any potentially corresponding opening/closing tag nodes.

Next, HTML attributes that are not in the whitelist are removed (at 804). This involves iterating through the attributes for each tag. For each attribute, the system checks whether or not it belongs in the whitelist for each tag. If the attribute belongs, the process proceeds to protocol checking, assuming that the attribute is a recognized protocol-based attribute. If the attribute does not belong, then the attribute key and value are removed.

The process then removes HTML protocols that are not in the whitelist (at 806). This involves iterating through protocol-based HTML attributes for each tag. For each attribute value, the process parses the protocol as a URL. If the URL is valid and the schema matches the whitelisted definition, then the sanitized version is accepted. If it is invalid, then the entire attribute, including the value, is removed.

Subsequently, CSS selectors that are not in the whitelist are removed (at 808). This involves iterating through the selectors within <style> and <link> tags, sources of CSS definitions that are involved with rendering an HTML document. If the selector has been whitelisted, then the process proceeds to property/value examination. If it is invalid, then the selector, as well as all of the nested key/values, is removed.

Then, CSS properties that are not in the whitelist are removed (at 810). This involves iterating through the properties for a defined selector in <style> and <link> tags or as "style" attributes on a specific HTML tag. If a property has been whitelisted, the system checks the value. If it is invalid, then the CSS property, including the name and value, is removed.

Next, the process validates CSS property values/protocols to conform to the CSS specification (at 812). This involves iterating through each property/value combination and verifying that the CSS property value meets the requirements set forth in the CSS specification. If it does not, then the property, including the name and value, is removed.

Next, the data within attribute values is encoded (at 814). This involves running an encoder for text within attribute values. This is done to escape potential HTML fragments, such as the "<" and ">" characters. Likewise, data within text nodes is also encoded (at 816). This involves running an encoder for text nodes. This is done to prevent the creation of errant HTML constructs.

Subsequently, the closing HTML tags that have missing opening tags are removed (at 818). This involves iterating through the HTML tag nodes. If the tag has been closed but does not match an opening tag, then it is removed. Matching closing HTML tags for opening tags that are not closed are then inserted (at 820). This involves correctly inserting HTML tag nodes for nodes that have been opened but remain unclosed. When new matching nodes are added, the opening/closing positions are updated throughout the entire token stream.

Lastly, media tags (embeds/objects) are coerced into safe variants (at 822). This involves iterating through the rich media tags (embeds/objects) and coercing them based on type, class identifier, and URL endpoints for the destination file. This completes the parsing process. Parsing in this manner ensures that XSS and SQL injection attacks are filtered effectively.

V. Parsing Example

Now an example of parsing tokenized user-generated content will be provided to assist in clarification of the process. Note, however, that this example is but one possible way of parsing and is not intended to limit the overall scope of this disclosure.

In this example, an XSS attack that automatically redirects users to a malicious site (http://badsite.com) in JavaScript in the inner text of an HTML "script" tag is provided which does not require a user action other than loading the page:

<script>window.location="http://badsite.com";</script>

After tokenization, as described above, the token stream looks like:

```
[
    {
        class : tag,
        name : "script",
        type : opening,
        opening : 0,
```

```
        closing: 2
    },
    {
        class : text,
        text : "window.location=\"http://badsite.com\"",
    },
    {
        class : tag,
        name : "script",
        type : closing,
        opening : 0,
        closing: 2
    },
]
```

Once this token stream goes through the parser, step 1 will remove the first and third elements, which is the <script> tag. The <script> tag is the simplest way of embedding JavaScript onto a page. This tag would never be in the whitelist, and therefore always eliminated during the parsing phase. The final piece of content is simply: window.location="http://badsite.com"—this is safe text content that does not create future exploits.

In this case, any HTML attribute that begins with "on" is an attribute that enables JavaScript execution. This attribute would be absent from the blacklist and therefore removed from the tag.

<div onload="window.location='http://badsite.com';"></div>

This token stream looks like:

```
[
    {
        class : tag,
        name : "div",
        type : opening,
        attributes : { "onload" : "window.location='http://badsite.com';" },
        opening : 0,
        closing: 1
    },
    {
        class : tag,
        name : "div",
        type : closing,
        opening : 0,
        closing: 1
    },
]
```

In this case, any HTML attribute that begins with "on" is an attribute that enables JavaScript execution. This attribute would be absent from the blacklist and therefore removed from the tag.

Likewise, here is provided a XSS attack similar to the one above, but now as an HTML attribute protocol—in this case, the user has to explicitly click on the link:

<a href="javascript://window.location='http://badsite.com'">Link</a>

The token stream resulting from this script would looks like:

```
[
    {
        class : tag,
        name : "a",
        type : opening,
        attributes : { "href" : "javascript://window.location='http://badsite.com'" },
    },
    opening : 0,
```

```
        closing: 2
    },
    {
        class : text,
        text : "Link"
    },
    {
        class : tag,
        name : "a",
        type : closing,
        opening : 0,
        closing: 2
    },
]
```

Like the above attempts, this XSS attack in this case is disguised within a protocol-based attributed. This would be removed, as JavaScript protocols would never be in the whitelist.

In sum, the present invention provides systems and methods for tokenizing and parsing user-generated content in order to prevent content attacks like XSS or SQL injection. Such systems and methods utilize whitelists rather than traditional blacklist filters, thereby eliminating the reactive nature of attack prevention common to all current systems. Likewise, whitelist filtering does not increase in configuration size as additional attacks are discovered, thereby ensuring consistent and efficient filtering even over time.

While this invention has been described in terms of several embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for tokenizing user-generated content, using a computer implemented security system, the method comprising:
    pre-processing a user-generated content input string utilizing a secondary input of target language, wherein the pre-preprocessing converts existing text into a token stream text node at the start of an HTML tag for insertion into a token stream; and
    extracting tokens, using a processor, from the pre-processed user-generated content string to generate the token stream, wherein the token stream is yielded to a caller rather than the user-generated content to prevent attacks on the user-generated content;
    wherein the extraction of tokens from the pre-processed user-generated content requires scanning the pre-processed user-generated content string by individual runes, and sending each rune to a specific buffer based upon signaling individual finite state machines.

2. The method of claim 1, wherein the tokens represent a string of characters or equivalent in bytes.

3. The method of claim 2, wherein the tokens are categorized according to rules as a symbol.

4. The method of claim 3, wherein the extraction is performed through an activation of finite state machines.

5. The method of claim 4, wherein the tokens belong to one of a plurality of buffers, wherein the plurality of buffers include at least one of text, HTML tag name, HTML attribute name, HTML attribute value, CSS selector, CSS property name, and CSS property value.

6. The method of claim 5, further comprising a conversion of buffers into nodes and subsequently appending those nodes to the token stream.

7. The method of claim 6, further comprising inserting remaining buffers that did not activate finite state machine states into the token stream as token stream nodes.

8. The method of claim 7, further comprising returning the token stream, comprised of token stream nodes.

9. The method of claim 5, further comprising clearing finite state machine variables, token markers, and string buffers at the end of the tokenizing.

10. A security system for tokenizing user-generated content comprising:
- a pre-processor configured to process a user-generated content input string utilizing a secondary input of target language, wherein the pre-processor converts existing text into a token stream text node at the start of an HTML tag for insertion into a token stream; and
- a tokenizer, including a processor, configured to extract tokens from the pre-processed user-generated content string to generate the token stream, wherein the token stream is yielded to a caller rather than the user-generated content to prevent attacks on the user-generated content;
- wherein the tokenizer scans the pre-processed user-generated content by individual runes, and sends each rune to a specific buffer based upon signaling individual finite state machine states.

11. The system of claim 10, wherein the tokens represent a string of characters or equivalent in bytes.

12. The system of claim 11, wherein the tokens are categorized according to rules as a symbol.

13. The system of claim 12, wherein the extraction of tokens is performed through activation of finite state machines.

14. The system of claim 13, wherein the tokens belong to one of a plurality of buffers, wherein the plurality of buffers include at least one of text, HTML tag name, HTML attribute name, HTML attribute value, CSS selector, CSS property name, and CSS property value.

15. The system of claim 14, wherein the tokenizer is further configured to convert buffers into strings which are HTML encoded, and appending the strings to the token stream as token stream nodes.

16. The system of claim 15, wherein the tokenizer is further configured to insert remaining buffers that did not activate finite state machines into the token stream as token stream nodes.

17. The system of claim 16, wherein the tokenizer is further configured to return the token stream full of token stream nodes.

18. The system of claim 14, wherein the tokenizer is further configured to clear finite state machine variables, tokenizer markers, and string buffers at the end of tokenizing.

* * * * *